US010704646B2

(12) United States Patent
Dershem

(10) Patent No.: US 10,704,646 B2
(45) Date of Patent: Jul. 7, 2020

(54) BUNGEE CORD LOCK AND METHOD OF USE

(71) Applicants: Jeffrey L. Dershem, Zionsville, PA (US); Deborah L. Dershem, Zionsville, PA (US)

(72) Inventor: Jeffrey L. Dershem, Zionsville, PA (US)

(73) Assignees: Jeffrey L. Dershem, Zionsville, PA (US); Deborah L. Dershem, Zionsville, PA (US)

( * ) Notice: Subject to any disclaimer, the term of this patent is extended or adjusted under 35 U.S.C. 154(b) by 0 days.

(21) Appl. No.: 15/946,924

(22) Filed: Apr. 6, 2018

(65) Prior Publication Data

US 2018/0298983 A1 Oct. 18, 2018

Related U.S. Application Data

(60) Provisional application No. 62/484,498, filed on Apr. 12, 2017.

(51) Int. Cl.
*F16G 11/04* (2006.01)
*F16G 11/14* (2006.01)

(52) U.S. Cl.
CPC .......... *F16G 11/046* (2013.01); *F16G 11/143* (2013.01)

(58) Field of Classification Search
CPC .............................. F16G 11/046; F16G 11/143
See application file for complete search history.

(56) References Cited

U.S. PATENT DOCUMENTS

| 6,094,784 A * | 8/2000 | Schrader | B60P 7/0807 24/136 R |
| 2002/0042974 A1* | 4/2002 | Steiner | F16G 11/14 24/130 |
| 2006/0085956 A1* | 4/2006 | Stevens | F16G 11/048 24/300 |
| 2009/0119891 A1* | 5/2009 | Leung | B60P 7/0807 24/68 CD |
| 2011/0005041 A1* | 1/2011 | Gangakhedkar | B60P 7/0823 24/302 |
| 2011/0225779 A1* | 9/2011 | Jones | B60J 7/104 24/301 |

\* cited by examiner

*Primary Examiner* — Robert Sandy
*Assistant Examiner* — David M Upchurch
(74) *Attorney, Agent, or Firm* — Clark & Brody LP

(57) ABSTRACT

A bungee cord lock includes a frame having a hook on one end thereof and a pair of channels and locking tabs for locking a bungee cord in place. The bungee cord lock can be used with a bungee cord for securing one or more articles. One type of bungee cord is a strap having a dog bone cross sectional profile.

11 Claims, 5 Drawing Sheets

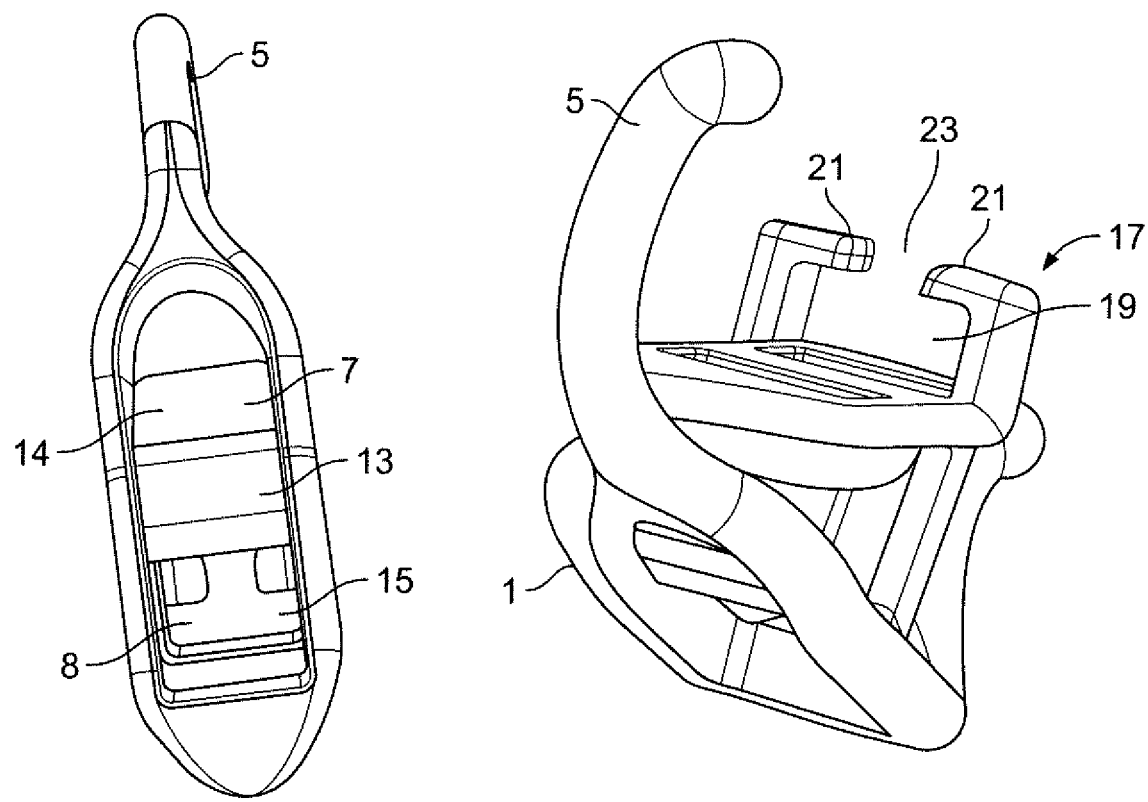
FIG. 4
FIG. 5
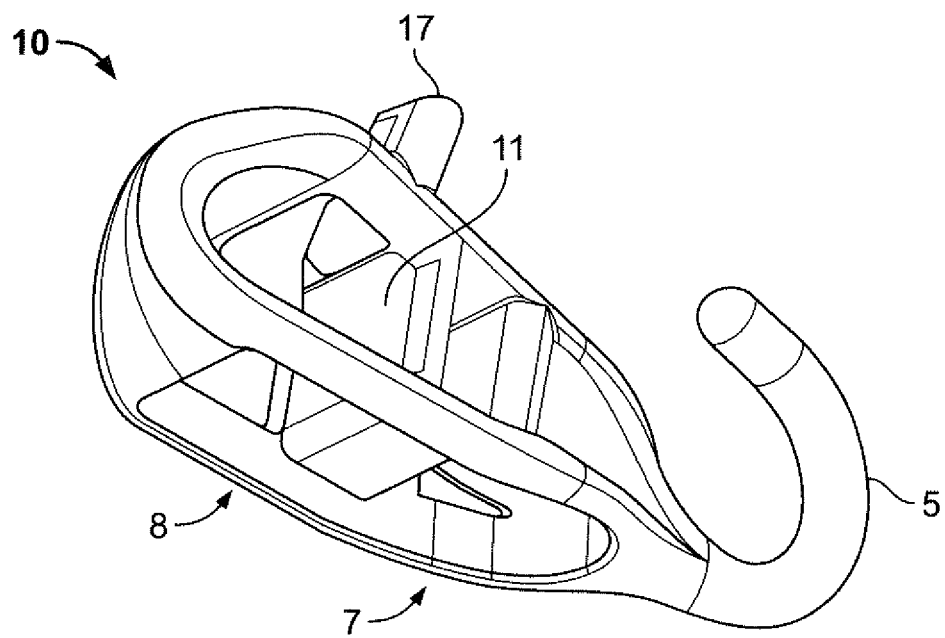
FIG. 6

BUNGEE CORD LOCK AND METHOD OF USE

This application claims priority under 35 USC 119(e) based on application No. 62/484,498, which was filed on Apr. 12, 2017 and is hereby incorporated in its entirety by reference herein.

FIELD OF THE INVENTION

The present invention is directed to a bungee cord lock and, in particular, to a bungee cord lock that includes a dog bone shaped cross section bungee cord and frame with a cord friction locking feature to secure the bungee cord to the frame and use an indeterminate length of bungee cord when using the bungee cord and a pair of bungee cord locks or multiple strap locks along the indeterminate length.

BACKGROUND ART

Bungee hooks are known in the prior art and one is illustrated in FIG. 12 and is designated by the reference numeral 100. This type has a hook part 101 with a hook 103, a hook base 105, and a sleeve 107 extending from the hook base 105. The sleeve 107 has a pair of tabs 109, with one end 111 being integral with the sleeve and the other end 113 being free for pivotal movement about the integral connection at 111 of the one end. A cylindrical member 115 is provided. The cylindrical member 115 has a through bore 117 and is sized to fit over the sleeve 107. A free end of a bungee cord is inserted through the bore 117 in the cylindrical member 115 and onto the sleeve 107. The cylindrical member 115 is then push fit onto the sleeve 107. The inner surface of the cylindrical member 115 contacts the tabs 109 and forces them toward the center of the sleeve where they engage surfaces of the bungee cord and hold it in place. The other end of the bungee cord is equipped with another hook/lock so that it can be used to secure an article or the like.

One problem with this design is that the length of the bungee cord is predetermined and if the length of the cord is not correct, e.g., too short, the bungee cord would have to be scrapped or used in another application and another cord has to be used and the process of attaching the bungee hooks has to be done again. As such, there is a need for improved bungee cord hooks and the present invention responds to this need.

SUMMARY OF THE INVENTION

It is a first object of the invention to provide an improved bungee cord lock, which can utilize a bungee cord.

A further object of the invention to provide a bungee cord lock that has a locking feature and allows an adjustable indeterminate length of bungee cord to be used when attaching one or more of the bungee cord locks to a bungee cord. As part of the attachment process of the bungee cord to one, two or more than two bungee cord locks, the length of the bungee cord needed between the hooks of the bungee strap locks can be set and/or adjusted as needed. More particularly, the bungee cord lock could be used at the ends of a bungee cord or at the ends and between the ends along a length of the cord, or just at one end depending on the need for securing an article or the like in place.

The invention also includes the use of the bungee cord lock with a bungee cord, and optionally a pair of bungee cord locks with a bungee cord, or one bungee cord lock with a bungee cord, one end of the bungee cord having a hook, loop or other connector attached to the one end for use in securing an article.

The bungee cord for the bungee cord lock can have any cross sectional shape, including circular, oval, rectangular, square, dog bone, and the like.

BRIEF DESCRIPTION OF THE DRAWINGS

Reference is now made to the drawings of the invention wherein:

FIG. 4 is a rear view of the bungee cord lock of FIG. 1.

FIG. 5 is a bottom and side perspective view of the bungee cord lock of FIG. 1.

FIG. 6 is a top and side perspective view of the bungee cord lock of FIG. 1.

DESCRIPTION OF THE PREFERRED EMBODIMENTS

Figure 2:
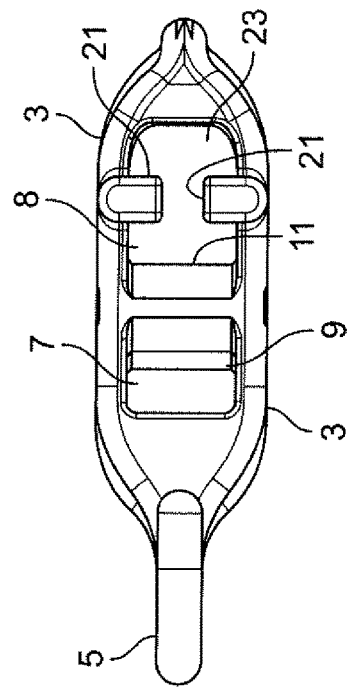
FIG. 2 is a side view of the bungee cord lock of FIG. 1.
Figure 3:
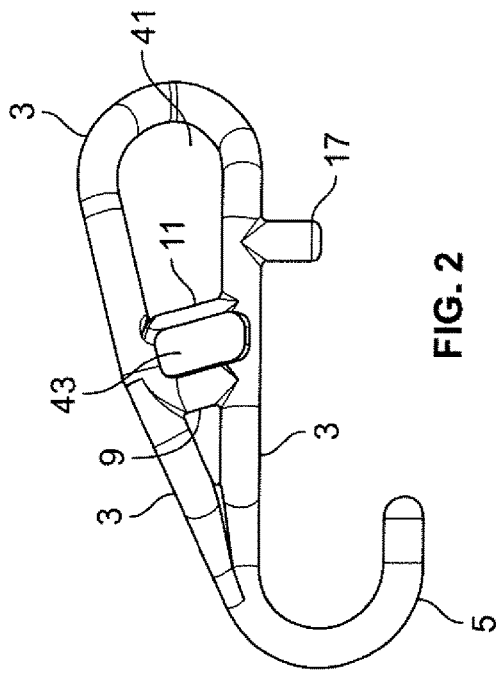
FIG. 3 is a front view of the bungee cord lock of FIG. 1.

The invention provides an improved bungee cord lock. The bungee cord lock allows one or more of the bungee cord locks to be connected to an indeterminate or predetermined length of bungee cord. The invention is also suited for use with bungee straps having a dog bone or rectangular cross section. For purposes of this description, bungee cord encompasses any type of cross section of the cord, including circular, oval, rectangular, square, dog bone, and others like these.

One embodiment of an inventive bungee cord lock and the lock assembly including a bungee cord is shown in FIGS. 1-8.

FIGS. 1-8 depicting the first embodiment of the invention show a bungee cord lock designated by the reference numeral 10. The lock 10 has a frame 1 that is made up of a number of interconnecting members 3. One end of the frame 1 has a hook 5 extending therefrom. The description of the lock 10 is detailed above making reference to a bungee strap but other configurations of bungee cord are believed to be equally useful in the inventive bungee cord lock 10.

The frame 1 has a pair of channels. A first channel 7 extends through the frame 1 and functions as an entry channel for an end of a bungee strap. The frame 1 has a second channel 8 that also extends through the frame and functions as an exit for the bungee strap. The first channel has a surface 9, see especially FIGS. 1 and 3, and the second channel 8 has a surface 11, see especially FIGS. 3 and 6. A frame 1 is also shown with a third surface 13 that is positioned between an exit 14 of the first channel 7 and an entrance 15 of the second channel 8, see especially FIG. 4.

The frame 1 also has a pair of locking tabs 17 extending from the frame 1. Each locking tab 17 is L-shaped so as to create a channel 19 between ends 21 of the tabs 17 and the frame 1. The ends 21 of the locking tabs 17 are sized to leave an opening 23 between the ends 21 to facilitate insertion and removal of a bungee strap, see FIG. 5 especially.

Figure 7:
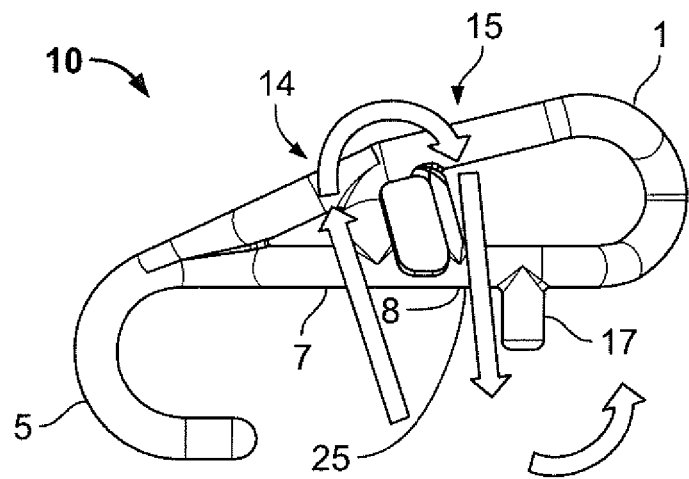
FIG. 7 is an enlarged side view of the bungee cord lock of FIG. 1 showing the directional inserting movement or threading of a bungee cord to be used therewith.
Figure 8:
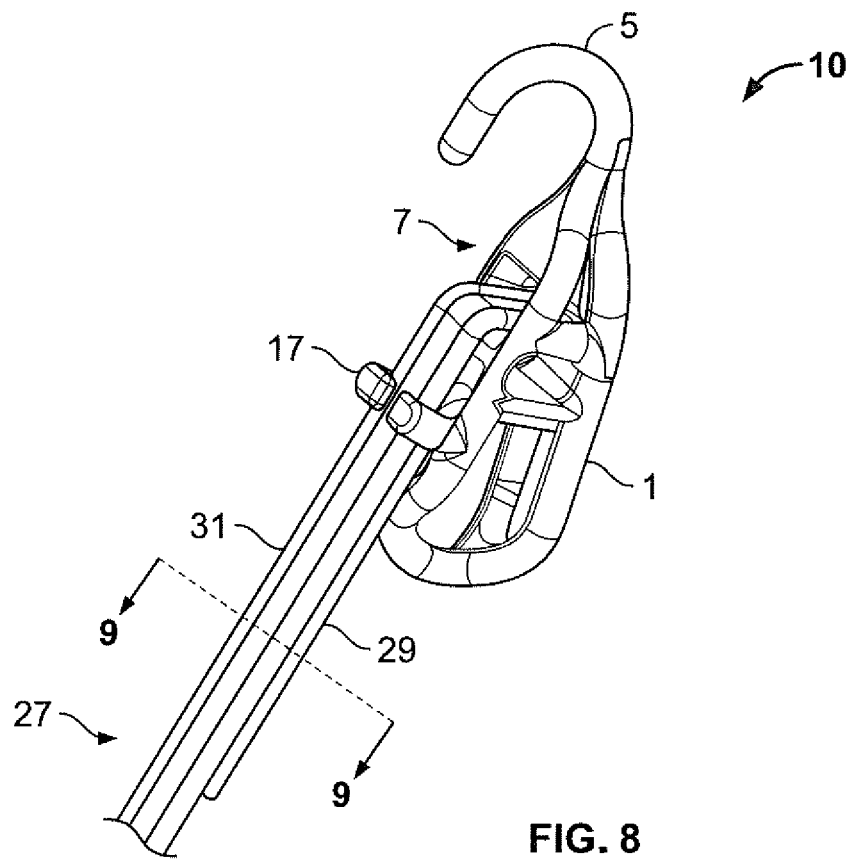
FIG. 8 shows the bungee cord lock of FIG. 1 with a bungee strap secured thereto.

Referring now to FIGS. 7 and 8, in use, an end of bungee strap 27 having, for example, a rectangular or dog-boned cross section is threaded, in sequence, through the first channel 7, out the exit end 13 of the first channel 7 and into the entrance end 15 of the second channel 9, and out an exit end 25 of the second channel 9. When the bungee strap exits end 25 of the second channel 9, a portion is paired with another portion of the strap that does not interface with the lock 10 and that extends from the entry of the channel 7 in a direction away from the hook 5. Both of these portions are passed through the opening 23 in the locking tabs 17, thus producing the configuration in FIG. 8. The portions of the bungee strap that overlap are designated by reference numerals 29 and 31. The portion 31 is that part of the strap 27 that is not positioned between the locking tabs 17 and channel 7 and terminates in another end of the bungee strap. Once the overlap terminates, the strap portion 32 extends in a further length (not shown in the drawings) and is used in another bungee strap lock 10 or other bungee strap end configuration, e.g., just a hook or loop. As these terminations are well known in the bungee cord art, a further explanation is not required for understanding of the invention.

Still referring to FIG. 8, it can be seen that the strap 27 is in contact with the surfaces 9 and 11 of the first and second channels 7 and 8. Also, the surface 13 shown in FIG. 4 would also have contact with the bungee strap. It should be understood that the surface 13 could be optional so that a space exists where the surface 13 is shown. In this mode, the surfaces 9 and 11 and the overlap between the portions 29 and 31 and any contact between the frame 1 and portion 29 would assist in creating the desired locking of the bungee strap.

More particularly, the strap 27 upon exiting the second channel 8 is in contact with itself, including when the overlapping strap portions extends through the channel 9 of the locking tabs 17 and along a portion of the frame 1 extending from an exit end 25 of the channel 19. The portion 31 of the strap would normally be in tension when a pair of bungee strap locks are in use and the bungee strap 27 extends between the two locks 10. The tension in the strap portion 31 holds the strap 27 in place on the bungee strap lock 10 as a result of the portions of the bungee strap in contact with the surfaces 9 and 11 of the first and second channels and the contact between the overlapping portions 29 and 31 of the bungee strap 27.

Figure 11:
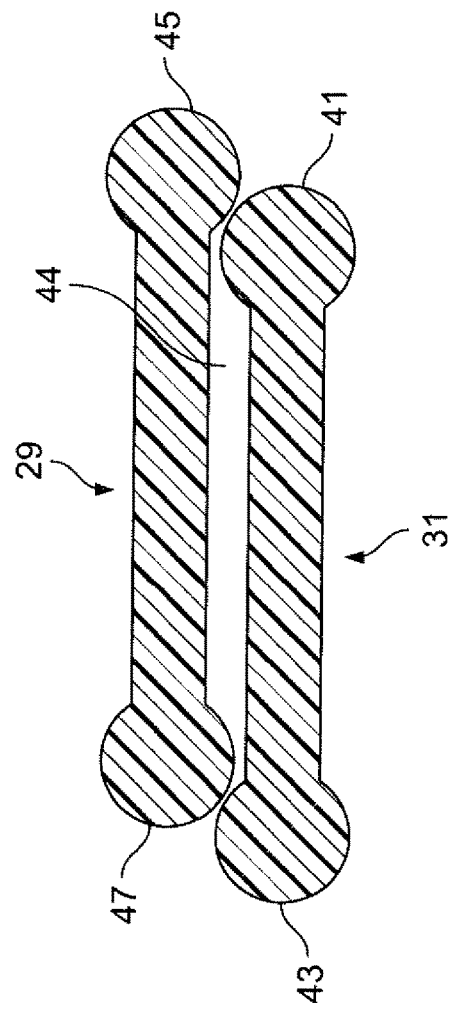
FIG. 11 shows a cross sectional view along the line IX-IX of FIG. 8.
Figure 12:
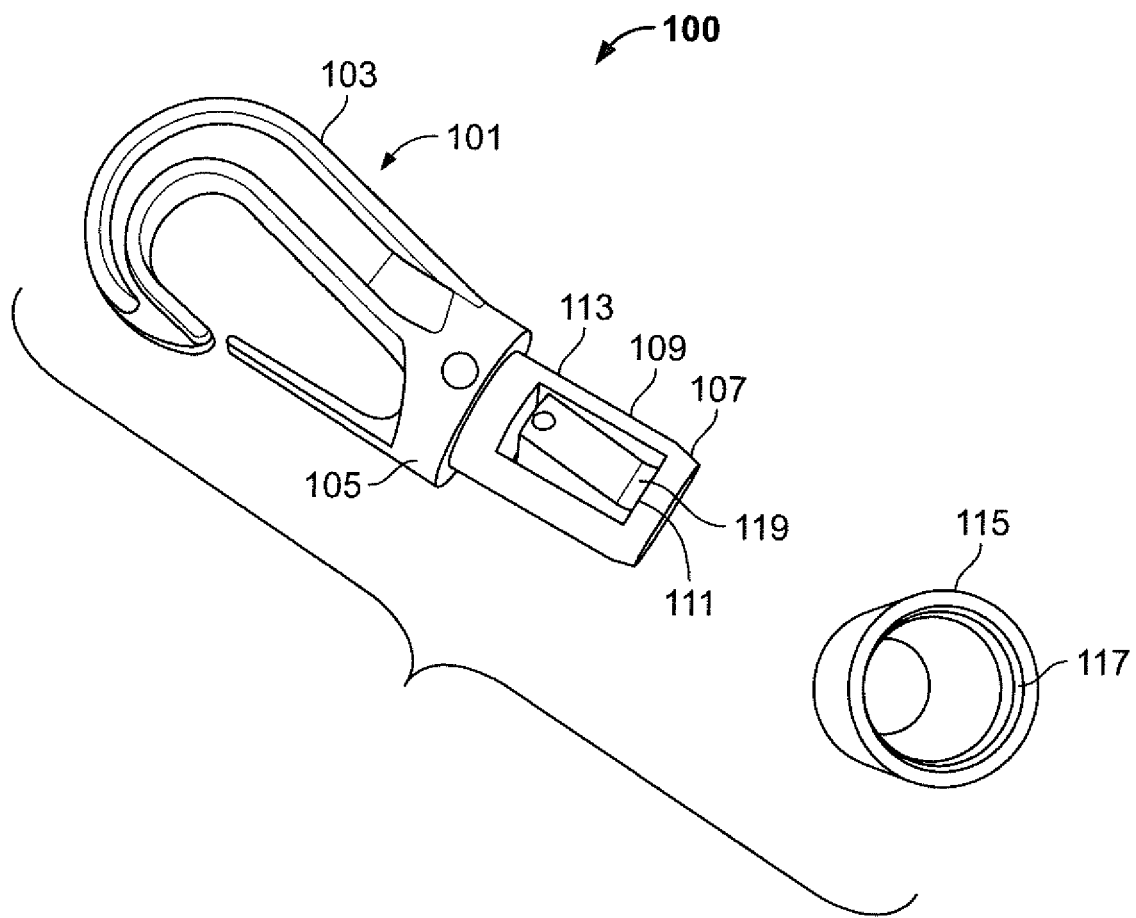
FIG. 12 shows a prior art bungee cord hook/lock.

In this regard and with reference to FIG. 11, the strap portions 29 and 31 are shown in cross section when the strap portion 31 is tensioned as a result of the use of the bungee strap in a particular application. During the tension, the strap portions 29 and 31 shift laterally so that the end portion 41 of strap portion 31 rests in the space 44 between the end portions 45 and 47 of the strap portion 29 with the end portion 41 abutting end portion 45 of the strap portion 29. The other end portion 43 of strap portion 31 is positioned outside of the space 44 and in abutting engagement with the other end portion 47 of the strap 29. With this configuration, more surface contact exists between the two portions 29 and 31, thus increasing friction and the holding power of the bungee during an application.

As noted above, the length of the bungee strap 27 can be adjusted by shortening or lengthening of the overlap of the portions 31 and 29. For example, extending the overlap by feeding more bungee strap into the channels 7 and 8 would shorten the operative length of the bungee strap. Shortening the overlap by using less bungee strap length feeding into the lock 10 would make the operative length of the bungee strap longer.

The frame can have any shape providing the hook, first and second channels and locking tabs are included therewith and can be made in any way and with any materials. A preferred way of manufacturing is injection molding the frame and the materials for the frame are preferably chosen from reinforced injection mold-able plastics.

Figure 9:
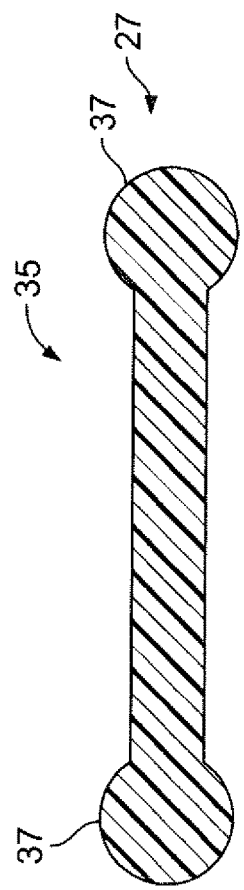
FIG. 9 shows the cross-sectional profile of the bungee strap shown in FIG. 8.

FIG. 9 shows a cross section of the dog bone cross section bungee strap 27 of FIG. 8. The strap 27 has a center elongated section 35 and opposing enlarged sections 37. The strap 27 is preferably made by extruding a polyurethane or similar material. By extruding the dog bone cross section, less material is used without a loss in the strength of the bungee strap, thus reducing the cost of the strap itself. When using a dog bone bungee strap, the frictional contact between the enlarged ends 37 of the dog bone strap 27 and the surfaces of the first and second channels and the overlapping portions is sufficient to achieve the locking function of the lock 10.

Figure 10:
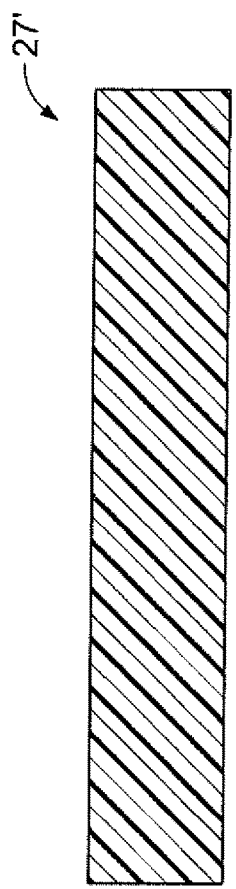
FIG. 10 shows a cross sectional profile of an alternative strap.

With reference to FIG. 10, a strap 27' having just a rectangular cross section could also be employed with the bungee strap lock 10.

The bungee strap for use with the inventive bungee strap lock can be any type of a known bungee cord. These include cloth-covered rubber bungees, rubber bungees, bungees made from urethane material, either extruded, molded, or cast, or the like. Exemplary materials to be used when molding or extruding the bungee strap could include elastomeric compounds of gum rubber, epdm rubber, silicone, silicone vulcanizate, thermal cast urethane and extruded/injection molded-thermal plastic urethane.

A single bungee strap lock with a bungee strap could be used if the application did not need a pair of hooks and locks. If a pair of hooks are required, a pair of bungee strap locks would be used or one bungee strap lock and a conventional hook. Also, the needed length of the bungee strap between the hooks may not be apparent until the one or more bungee strap locks are attached to a bungee strap and the bungee strap and with its hooks is tried for a given use. It may turn out that the assembled bungee strap and bungee strap locks are either too short or too long. In this case, the bungee strap in the bungee strap lock can be loosened and repositioned so that the desired length is obtained.

Figure 1:
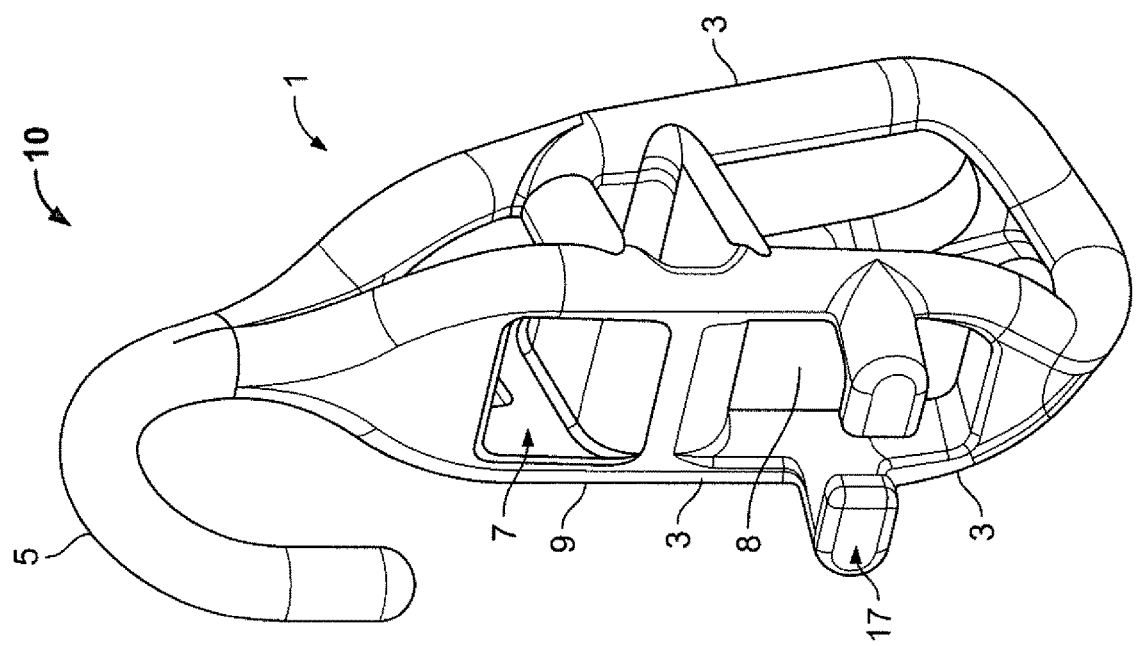
FIG. 1 is perspective view of one embodiment of the inventive bungee cord lock.

While the bungee strap lock is shown with frame members with a generally circular cross section, other cross sectional shapes could be provided as long as they permit the locking of the bungee strap. Also, extraneous open areas, e.g., the space 41 shown in FIG. 2 that is not needed for feeding the bungee strap 27 through the channel 8 could be made solid. Similarly, a space disposed between the channel 7 and hook 5 not needed for bungee strap feeding could be made solid as part of the frame construction. Further yet, while there is a space 43, see FIG. 2, between the surfaces 9 and 11, this space could also be made solid if so desired. The advantage of the embodiment of FIG. 1 is that the frame has the necessary strength to function as a lock, but uses a reduced amount of material, thus saving in manufacturing costs.

The invention also entails the use of the lock 10 and a bungee strap 27. That is, the bungee strap 27 with a pair of locks 10 engaging opposite end portions of the strap 27 can be used to secure an item just like a conventional bungee cord and lock would be used. In this embodiment, the length of the bungee strap can be adjusted using either lock 10.

The bungee strap 27 could also be used to secure an item by using just one lock 10 and having the other end of the bungee strap having a connector secured thereto. In this embodiment, the one lock 10 would provide the length adjustment feature. In yet another embodiment, a strap with more than two locks can be employed with the locks spaced apart along the length of the strap. With the ability of the lock to be moved along the length of the strap, the in-between locks can be positioned at any location of the strap between the ends thereof.

As such, an invention has been disclosed in terms of preferred embodiments thereof which fulfills each and every one of the objects of the present invention as set forth above and provides a new and improved bungee strap lock and method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A bungee cord lock comprising:
    an injection molded frame having a longitudinal direction, the injection molded frame including:
    a front side and a rear side,
    a hook extending from the injection molded frame,
    a first channel having a first surface and a second channel having a second surface, the first and second channels each extending through the injection molded frame in a direction transverse to the longitudinal direction and between the front side and the rear side of the injection molded frame, the first channel positioned in the injection molded frame adjacent the hook;
    a pair of locking tabs, each locking tab extending from the front side of the injection molded frame and positioned adjacent a first opening of the second channel, the second channel positioned between the first channel and the pair of locking tabs, the locking tabs and injection molded frame forming a third channel,
    wherein the first, second, and third channels are positioned so that when a bungee cord end is threaded in sequence through the first channel, the second channel, and the third channel, portions of a bungee cord overlapping themselves in the third channel and along a frame portion adjacent the third channel.

2. A bungee cord assembly comprising the bungee cord lock of claim 1 and a bungee strap.

3. The bungee cord assembly of claim 1, wherein the bungee cord is an extruded strap that has a dog bone profile in a cross section along a transverse direction of the extruded strap, the dog bone profile comprising an elongated center section with an enlarged section at each end of the elongated center section.

4. The bungee cord assembly of claim 2, wherein the bungee cord is made from one of gum rubber, epdm rubber, silicone, silicone vulcanizate, thermal cast urethane and extruded/injection molded-thermal plastic urethane.

5. The bungee cord assembly comprising a pair of the bungee cord locks of claim 1 and a bungee cord.

6. The bungee cord assembly of claim 5, wherein the bungee cord is an extruded strap that has a dog bone profile in cross section along a transverse direction of the extruded strap, the dog bone profile comprising an elongated center section with an enlarged section at each end of the elongated center section.

7. The bungee cord assembly of claim 5, wherein the bungee cord is made from one of gum rubber, epdm rubber, silicone, silicone vulcanizate, thermal cast urethane and extruded/injection molded-thermal plastic urethane.

8. In a method of securing an article using a bungee cord lock, an improvement comprising using the bungee cord lock of claim 1.

9. A bungee cord comprising a strap having a dog bone profile in cross section, the dog bone profile comprising an elongated center section with an enlarged section at each end of the elongated center section, the elongated center section and enlarged sections extending along a transverse direction of the strap.

10. The bungee cord of claim 9, wherein the bungee cord is made from one of gum rubber, epdm rubber, silicone, silicone vulcanizate, thermal cast urethane and extruded/injection molded-thermal plastic urethane.

11. The bungee cord of claim 9, wherein the bungee cord is an extruded strap.

* * * * *